(12) United States Patent
Cook et al.

(10) Patent No.: US 9,026,121 B2
(45) Date of Patent: May 5, 2015

(54) SIMULTANEOUS MULTI-MODE WIFI DIFFERENTIATED BY SSID

(75) Inventors: Charles I. Cook, Louisville, CO (US); Thomas Schwengler, Lakewood, CO (US)

(73) Assignee: Qwest Communications Interatnational Inc., Denver, CO (US)

( * ) Notice: Subject to any disclaimer, the term of this patent is extended or adjusted under 35 U.S.C. 154(b) by 637 days.

(21) Appl. No.: 13/363,118

(22) Filed: Jan. 31, 2012

(65) Prior Publication Data

US 2012/0127942 A1 May 24, 2012

Related U.S. Application Data

(63) Continuation of application No. 12/358,051, filed on Jan. 22, 2009, now Pat. No. 8,131,303.

(51) Int. Cl.
| | |
|---|---|
| *H04W 72/00* | (2009.01) |
| *H04W 48/12* | (2009.01) |
| *H04M 11/06* | (2006.01) |
| *H04W 28/20* | (2009.01) |
| *H04W 84/10* | (2009.01) |

(52) U.S. Cl.
CPC ............ *H04W 48/12* (2013.01); *H04M 11/062* (2013.01); *H04W 28/20* (2013.01); *H04W 84/10* (2013.01)

(58) Field of Classification Search
CPC . H04W 84/12; H04W 28/0268; H04W 28/18; H04W 48/16; H04W 48/18; H04W 72/048; H04W 72/06; H04W 76/02; H04W 76/021; H04W 80/00; H04W 84/18; H04W 88/06
USPC ............... 455/435.3, 41.2; 370/328, 329, 338
See application file for complete search history.

(56) References Cited

U.S. PATENT DOCUMENTS

| | | | |
|---|---|---|---|
| 8,131,303 B2 | 3/2012 | Cook et al. | |
| 2006/0153122 A1* | 7/2006 | Hinman et al. | 370/328 |
| 2006/0274792 A1 | 12/2006 | Abhishek et al. | |
| 2007/0171910 A1* | 7/2007 | Kumar | 370/392 |
| 2008/0152030 A1 | 6/2008 | Abramov et al. | |
| 2008/0239989 A1 | 10/2008 | Dekorsy | |

OTHER PUBLICATIONS

U.S. Appl. No. 12/358,051; Non-Final Office Action dated Jul. 11, 2011; 11 pages.
U.S. Appl. No. 12/358,051; Notice of Allowance dated Oct. 27, 2011; 10 pages.
U.S. Patent No. 8,131,303 B2; Original Letters Patent dated Mar. 6, 2012; 19 pages.
U.S Appl. No. 12/358,051; Issue Notification dated Feb. 15, 2012; 1 page.

* cited by examiner

*Primary Examiner* — Chuong A Ngo
(74) *Attorney, Agent, or Firm* — Swanson & Bratschun, L.L.C.

(57) ABSTRACT

Embodiments provide a wireless network with several access points connected to a communication infrastructure. Residential or business customers of the Internet arc provided an Internet interface (e.g., a digital subscriber line (DSL) modem) having a wireless transceiver. Two or more users may access the Internet or other network through the Internet interface. Each user can be assigned a unique Service Set-Identifier (SSID) with each SSID associated with a type of service (e.g., user video service, backhaul service, etc.). The amount of bandwidth assigned to the type of service (and user) may be governed by the equipment according to the assigned SSID.

23 Claims, 9 Drawing Sheets

SIMULTANEOUS MULTI-MODE WIFI DIFFERENTIATED BY SSID

CROSS-REFERENCE TO RELATED CASES

This application is a continuation of U.S. application Ser. No. 12/358,051, filed Jan. 22, 2009 by Charles I. Cook et al. and entitled, "Simultaneous Multi-Mode WiFi Differentiated By SSID," the entire disclosure of which is hereby incorporated by reference.

BACKGROUND

Many municipalities or organizations are attempting to create wireless networks throughout the city or town. The wireless network would allow citizens, residents, workers, etc., to connect to the Internet or other network from any location within the city or town. As such, people can interface for business or other reasons easily regardless of location.

To create the wireless networks, a first wireless access point is connected to the Internet. The connection is the gateway from the wireless network to the communications infrastructure (e.g. the phone company telecommunications network). From the first wireless access point, one or more other wireless access points are created that communicate with the first wireless access point. The other wireless access points share the bandwidth provided by the first wireless access point. More wireless access points may be connected further downstream and divide the bandwidth further. As can be seen, the more wireless access points built the further the bandwidth must be divided. The network access points become untenable at some point as the bandwidth cannot be divided further without diminishing the network's ability to provide service. Therefore, the wireless networks are limited in the area the networks can span and cannot grow or expand beyond a certain number of access points without imposing serious performance limitations. The limited access points can affect the quality of service provided to the user.

It is in view of these and other considerations not mentioned herein that the embodiments of the present disclosure were envisioned.

BRIEF SUMMARY

Embodiments presented in this application provide a wireless network with several access points connected to the communication infrastructure. In embodiments, residential or business customers of the Internet are provided an Internet interface (e.g., a digital subscriber line (DSL) modem) having a wireless transceiver. Two or more users may access the Internet or other network through the Internet interface.

Each user can be assigned a unique Service Set-Identifier (SSID). The user's access to the Internet interface is predicated on the SSID. In further embodiments, each SSID may represent a type of service. For example, the resident who owns the equipment may be assigned one or more SSIDs for phone service, data service, video or television service, etc. An SSID may be assigned to a backhaul service that allows another remote wireless access point to connect to the Internet through the equipment. Further, the amount of bandwidth assigned to the type of service may be governed by the equipment and assigned to each SSID as appropriate.

This Summary is provided to introduce some embodiments. The Summary is not meant to limit the claims in any manner or form—the possible embodiments are defined by the claims.

BRIEF DESCRIPTION OF THE DRAWINGS

The embodiments of the present disclosure are described in conjunction with the appended figures.

Figure 1A:
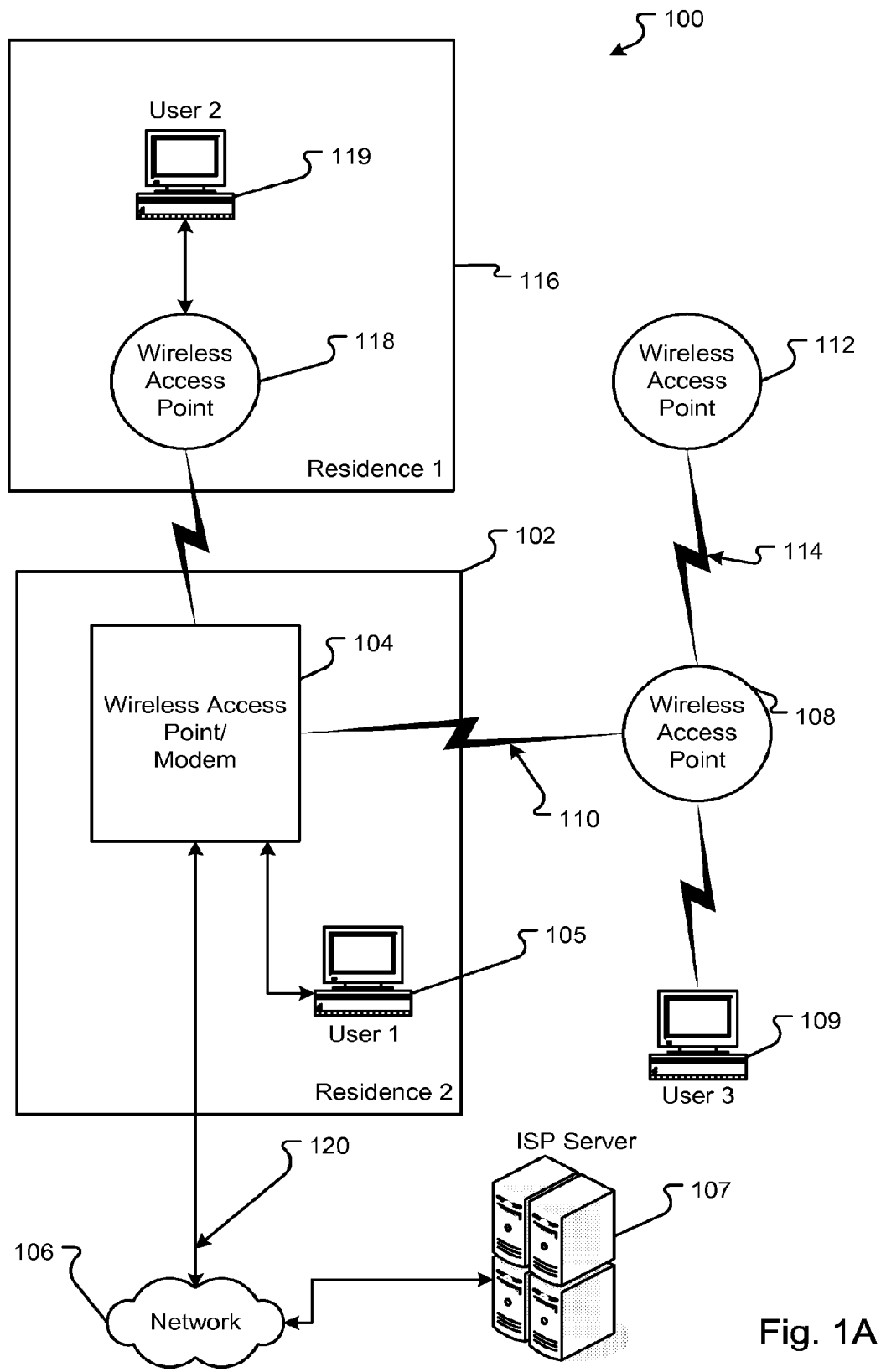
FIGS. 1A and 1B are block diagrams of embodiments of wireless networks.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide a unique and novel wireless network. The wireless network may be used to provide service to a municipality or other area. A home or business user can provide a point of presence (POP) for a wireless network to a communication infrastructure. For example, a user may install an Internet modem into their residence to provide Internet access. In embodiments, the equipment the user installs includes a wireless access point and an Internet interface. The Internet interface can be a DSL modem, a cable modem, or other communications device that can communicate over a network that accesses the Internet.

The wireless access point can provide service to both the local user that owns or leases the equipment but also provide a POP to one or more other users. For example, another user may be sitting at a park bench outside the residence and access the internet through the wireless access point. In alternative embodiments, the wireless access point can allow direct access by other users or provide access to one or more other wireless access points that use a backhaul function in the equipment. Users may include, but are not limited to, people accessing the system with a personal computer, other wireless access points, or wireless access points further downstream from the equipment.

To manage the different users and bandwidth, each type of service may be assigned a unique SSID. The SSID may be used by the equipment to limit the bandwidth or assign bandwidth to one or more user depending on who the user is or for what the user needs the service. In other embodiments, the SSID may be used to establish priorities for providing Quality of Service (QoS) parameters. For example, a user that owns the equipment and pays subscriber fees may have a first SSID associated with a private class of service. Another user accessing the Internet from an area outside the residence or business may have a second SSID associated with a public class of service. One or more wireless access points using a backhaul feature may have third or other SSIDs. Each type of service may receive a predetermined amount of bandwidth. For example, the resident with the first SSID may have the largest amount of bandwidth, while the other users may receive a portion of the remaining bandwidth.

While various aspects of embodiments of the disclosure have been summarized above, the following detailed description illustrates exemplary embodiments in further detail to enable one of skill in the art to practice the disclosure. In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form. Several embodiments of the disclosure are described below, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Figure 1B:
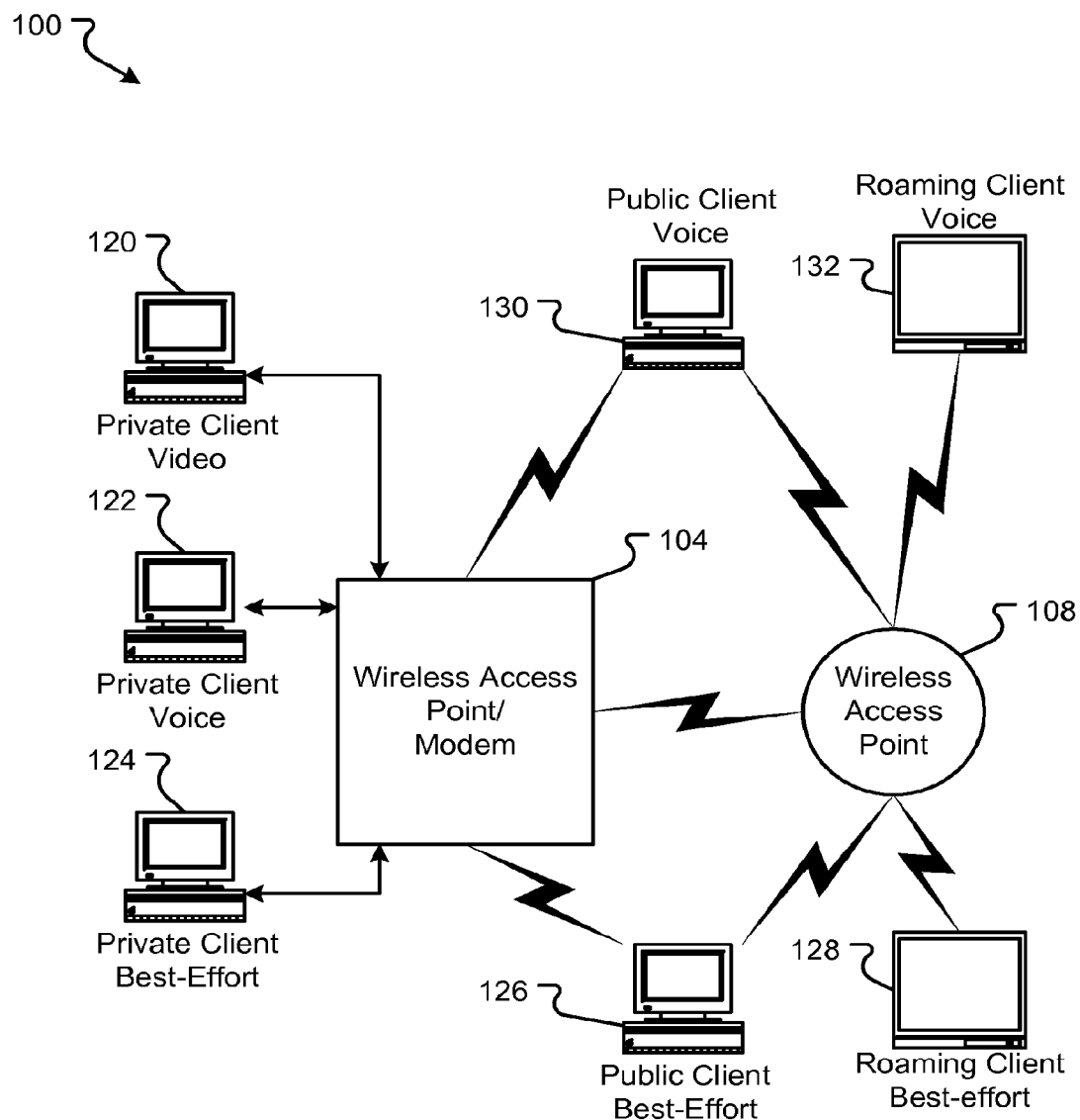

An embodiment of a system 100 for providing a wireless network is shown in FIG. 1A and FIG. 1B. In embodiments, the system 100 includes equipment 104 resident in or in proximity to a user's residence (residence 2), business, or other user facility or building 102. The equipment 104 may be purchased, leased, or used by the user (user 1) 105 as agreed in a service contract. For example, user 1 105 agrees to receive Internet access from a company (e.g., Qwest or another internet service provider). User 1 105 then receives the equipment 104 as part of the agreed service. In embodiments, user 1 105 can access the Internet through the equipment either by a wired or wireless connection as shown in FIG. 1.

In embodiments, the equipment 104 includes a wireless access point and an Internet interface. The interface to the Internet may be a modem, router, or other device for establishing communication with a network 106 over connection 120. The network 106 can be a communications network, for example, a phone company system, or other network that forms a portion of the Internet (e.g., the World Wide Web). In embodiments, the network 106 is the same as the Internet. Thus, a user interfacing with the equipment may be able to send information to and receive information from one or more websites over the Internet. In an embodiment, the Internet interface is a DSL modem, a cable modem, a microwave transceiver, a phone modem, a satellite transceiver, a router, or other device. Hereinafter, the Internet interface will be described as a DSL device. However, one skilled in the art will recognize that the Internet interface may be other devices, all of which may communicate through a network interfacing with or forming a portion of the Internet.

The equipment 104 provides a wireless access point for one or more other users (also referred to as clients). The wireless access point in equipment 104 can be any hardware and/or software operable to provide wireless communications for one or more computers. For example, the wireless access point is a transceiver operable to communicate using communication standard 802.11g, Bluetooth, or other wireless standard or protocol. Referring to FIG. 1B, the users or clients may belong to one or more user classes based on the type of user service offered, connection characteristics, bandwidth requirements, quality of service characteristics, type of data being downloaded or uploaded, or by one or more other distinctions. In an embodiment, clients may be separated into two classes—either private or public clients. Private clients are users that may have a contract with the ISP and are provided a secure and established amount of bandwidth. The private clients may include any user in a family or organization covered by the ISP contract. In other embodiments, the private clients are associated with the private WiFi network provided by equipment 104 and in communication with the Internet interface 104. Public clients may be clients that use the wireless network to access the Internet but do not have a contract with the ISP. Public clients can be given bandwidth as available, and the connection (being through a publicly accessible link) may not be secure or as secure as a private client's connection. In alternative embodiments, a public client is not associated with the private WiFi network provided by equipment 104.

Private clients may be further divided into subcategories depending on the type of user service provided. A private client can use the private client connection to access the Internet or for data (e.g., email), to download video or multimedia content, to make phone calls using VoIP, or for one or more other services. A first private client 124 is using a best-effort data service. A second private client 122 is using a voice service, and a third private client 120 is using a video service. One skilled in the art will recognize further types of user service that may be included. Further, private clients (clients contracting with the ISP) may access a wireless network associated with the ISP that is in a different location from their facility. In these situations, the private client is considered a roaming client. For example, a first roaming client 128 is using a best-effort data service through WAP 108, which is different from the client's normal access point. A second roaming client 132 may be using a voice service.

Public clients may also be further divided like private clients. Thus, a first public client is using a best-effort data service and a second public client is using a voice service. Some public clients may also be preferred. For example, police, fire rescue, public works, or other governmental agencies may receive preferred access as public clients. Further, public clients may also include access by a business equivalent. A business equivalent may be a user that has reciprocity with the ISP from a contract with another ISP.

Referring back to FIG. 1A, user 1 105 in residence 2 102 may be a private client and user 119 in residence 116 may be a roaming private client or a public client depending on if user 2 contracted with the ISP. User 2 119 may not have the equipment 104 to access the Internet but may have a contract with the same ISP and still be a private client. The contract with the ISP allows user 2 119 to access the Internet through one or more other user's equipment 104. In other embodiments, user 2 119 pays for the service per usage and does not have a contract with the ISP, and thus, is considered a public client. User 2 may access the equipment 104 through a wireless access point 118 that communicates with the wireless access point in the equipment 104. User 3 may be a roaming client or a public client.

The wireless network system 100 may include one or more other wireless access points, such as, wireless access points 108 and 112. Wireless access points 108 and/or 112 may be located outside any residence and provide wireless access to public clients or to private clients contracted with the ISP. In embodiments, the other wireless access points 108 and/or 112 include any hardware and/or software to communicate with the wireless access point in the equipment 104 and allow access by another user, such as user 3 109. The wireless access point 108 is in communication with the equipment 104 through wireless connection 110.

In embodiments, wireless access point 112 is in communication with wireless access point 108 through another wireless connection 114. Thus, wireless access point 112 communicates with the equipment 104 through wireless access point 108. A network of wireless access points can be created using the equipment 104 as a root node. However, one or more other residences can also include equipment 104 that functions as a root node. Thus, the wireless network is serviced not by a single or a few root nodes but by many root nodes within several residences or businesses. This configuration allows for larger bandwidth allocations and better service.

The system 100 may also include an ISP server 107 that is in communication with the equipment 104 through the network 106. The ISP server 107 can change settings or install new software or information to the equipment 104. Further, the TSP server 107 may communicate through the WAP 104 to the other WAPs 108 and 112. Thus, the ISP server 107 can manage the wireless network through the WAP 104. In embodiments, any connection shown in FIG. 1A or other figures may be wired, wireless, or a combination of wired and wireless connections, regardless of whether the connection is represented by a line or lightning bolt. These connections may be Bluetooth, 802.11b, wired LAN, or other type connection.

Figure 2:
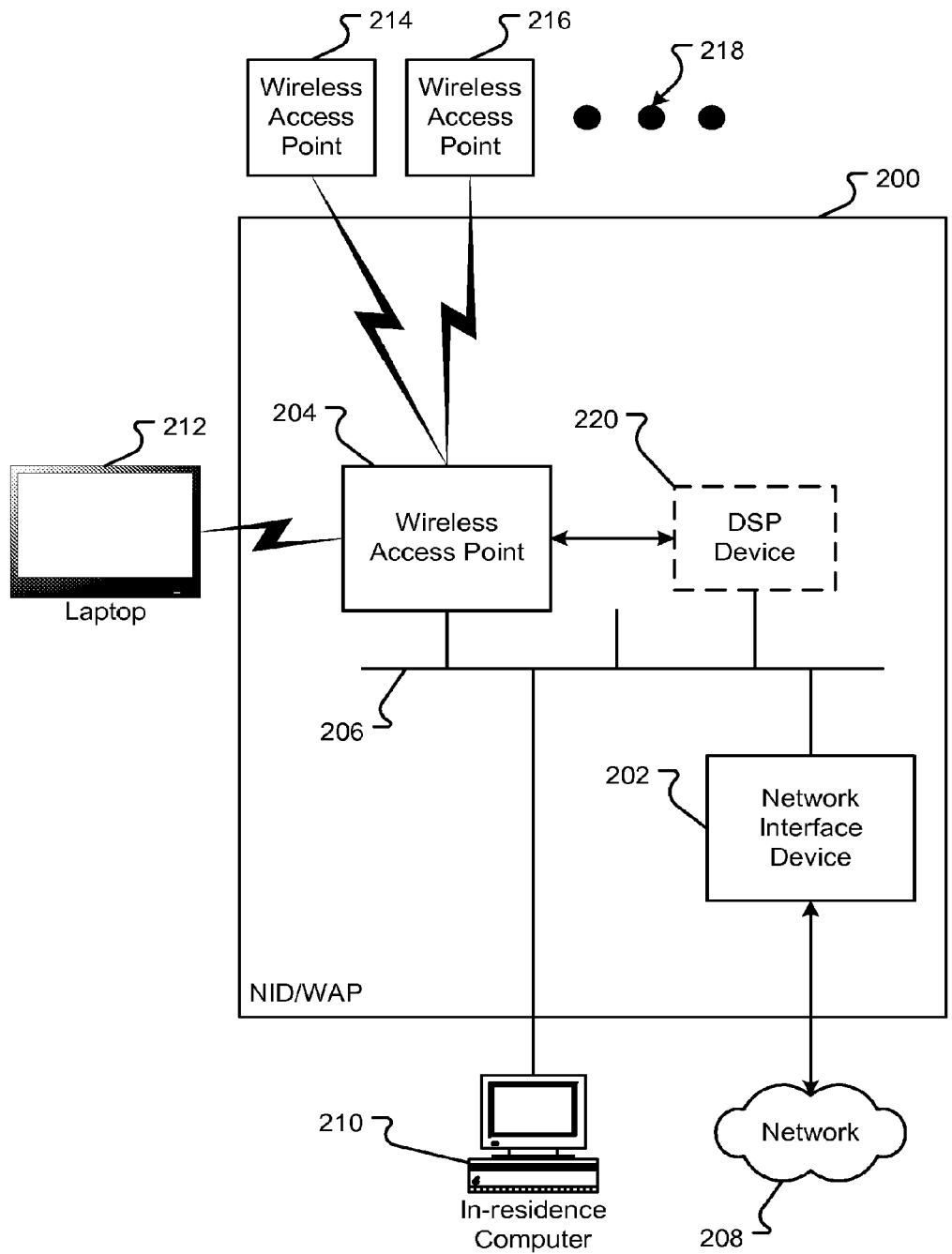
FIG. 2 is a block diagram of an embodiment of DSL/Wireless Access Point equipment.

One or more embodiments of the equipment 200 are shown in FIG. 2. In embodiments, equipment 200, hereinafter referred to as a NID/WAP, is the same or similar to equipment 104 described in conjunction with FIG. 1. The NID/WAP 200 can include, but is not limited to, a network interface device (NID) (e.g., a NID 202), a wireless access point (WAP) 204, and a communication bus 206. The NID 202 is hardware, software, or hardware and software for communicating with a network 208, which is a portion of or is in communication with the Internet. The NID 202 may be a DSL modem but the DSL modem is only one possible communication device that may be used in the NID/WAP 200. In other embodiments, the NID 202 is replaced with a cable modem that communicates with a cable network attached to the Internet, a satellite receiver and/or transceiver in communication with a satellite network that is attached to the Internet, etc. The NID 202 can communicate with a phone company network or other communication network or system and transmit data to and receive data from the Internet. The phone company (for example, Qwest) may function as the ISP. In embodiments, all communications to and from the Internet are communicated through the NID 202.

The WAP 204 is the hardware, software, or hardware and software for communicating wirelessly with one or more users. In embodiments, the WAP 204 is a wireless transceiver. The WAP 204 can communicate in a wireless standard, e.g., 802.11g, Bluetooth, etc. The WAP 204 communicates with one or more other wireless systems. For example, the WAP 204 communicates with laptop 212 over a wireless communications link. The WAP 204 can communicate with one or more other components, such as the NID 202, over a communication bus 206.

The communication bus 206, in embodiments, is a wired bus having one or more connection points for one or more components. The communication bus 206 provides a communication facility for the WAP 204 to communicate data to the NID 202. A user computer 210 can also be directly connected to the communication bus 206 that can transmit data to the NID 202. Thus, the communication bus 206 provides communication to and from the NID 202.

The WAP 204 can communicate with one or more other wireless access points. In embodiments, the bridge mode allows one or more WAPs to provide a backhaul service. For example, the WAP 204 communicates with WAP 214 and WAP 216 in a bridge mode. More or fewer WAPs may communicate with WAP 204 as represented by ellipses 218. In the bridge mode, the WAP 204 provides a link for WAP 214 and WAP 216 to access the Internet through NID 202. In embodiments, the bridge mode allows one or more WAPs to use a backhaul service. In operation, WAP 214 and WAP 216 communicate data to WAP 204. WAP 204 communicates the data over the communication bus 206 to NID 202, which transmits the data to network 208. In embodiments, the NID 202 receives data from the network 208 and sends the data to WAP 204 over the communication bus 206. WAP 204 sends the data to either of WAP 214 and WAP 216 over a wireless link.

In embodiments, the NID/WAP 200 includes a digital signal processor (DSP) device 220. The DSP device 220 can provide investigation, modification, cancellation, and creation of data within one or more data packets sent between WAP 204 and the NID 202. In embodiments, the DSP device 220 inspects packets communicating between the WAP 204 and the NID 202. The DSP device 220 can assist the WAP 204 and/or the NID 202 organize and manage communications within the NID/WAP 200. In embodiments, the functions performed by the DSP device 220 may be incorporated into the WAP 204 and/or the NID 202.

Figure 3:
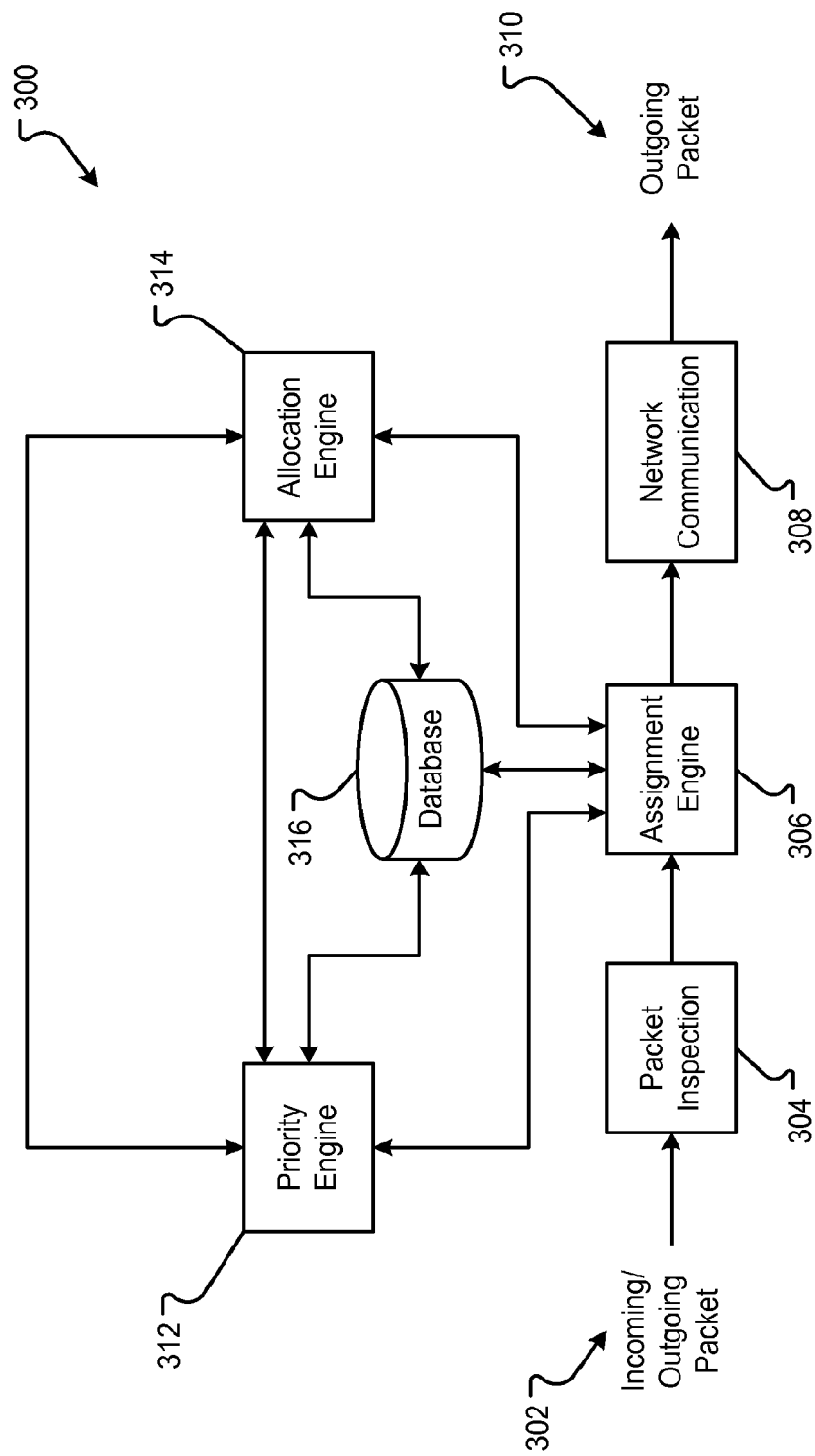
FIG. 3 is a block diagram of an embodiment of software and/or hardware components executable by the DSL/Wireless Access Point equipment.

An embodiment of software components 300 operable to manage communications in the NID/WAP is shown in FIG. 3. The software components 300 may execute in the DSP device 220 (FIG. 2), the NID 202 (FIG. 2), the WAP 204 (FIG. 2), or a combination of the DSP device 220 (FIG. 2), the WAP 204 (FIG. 2), and/or the NID 202 (FIG. 2). The software components 300 may include, but are not limited to, a packet inspection component 304, an assignment engine 306, a network communication component 308, a priority engine 312, and/or an allocation engine 314.

In embodiments, the software components 300 manage the several connections through the WAP 204 (FIG. 2) and through the NID 202 (FIG. 2). The NID 202 can have a limited or set amount of bandwidth to transmit data to the network 208 (FIG. 2). As such, the software components 300 manage which user is assigned which type of connection. A type of connection may be governed by how much bandwidth is allocated through the NID 202 (FIG. 2) or what quality of service (QoS) parameters are managed. QoS parameters may include jitter, latency, dropped packets, bytes, or bits, out-of-order-delivery, error rates, delay, etc. To achieve a predetermined level of QoS parameters, the connection may require more or less bandwidth. In embodiments, the type of QoS parameters is determined by the type of data being communicated. For example, delay or latency would make voice calls difficult, and therefore, the latency or delay for VoIP service would be good. In contrast, video service may not have as great a need for high latency metrics but may need very low dropped packets because dropped packets could cause pixilation of a video playback. Other types of data service would need other types of QoS settings, as one skilled in the art will recognize.

To identify the class of user, connection type, QoS parameters, type of user service, etc., the software components 300 can use the SSID. In embodiments, the software components 300 assign or determine the SSID and associate the SSID with a class of user or a type of service. For example, the private client (e.g., residential user) 210 (FIG. 2) may have a first SSID that is associated with a first type of service, e.g., best-effort data service. The WAP 214 can have a second SSID associated with a second type of service, e.g., backhaul service.

The packet inspection component 304 determines the SSID associated with an incoming/outgoing data packet 302. In embodiments, the data packets 302 may be incoming if the data packets are received from the network 208 (FIG. 2) and are bound for a user. The data packet 310 is outgoing if the data packet is from a user and bound for the network 208. The packet inspection component can perform deep packet inspection to determine the SSID.

In alternative embodiments, one or more of the software components shown in FIG. 3 are part of the ISP server 107 (FIG. 1A). For example, the ISP server 107 (FIG. 1A) can include the priority engine 312, the database 316, and/or the allocation engine 314. The ISP server 107 (FIG. 1A) may also share some or all the functionality of these components with the WAP. The ISP server 107 (FIG. 1A), having the priority engine 312, the database 316, and/or the allocation engine 314, can manage the allocation of bandwidth or provision of QoS parameters remotely. For example, the ISP server 107 (FIG. 1A) determines that all private clients should have the highest priority over the public clients or the roaming clients. As such, the priority engine 312 sets the priority, and the allocation engine 314 establishes rules for allocating the bandwidth according to the priority. The priority and allocation rules may be saved in the database 316. Then, when needed, the WAPs using the ISP can retrieve the rules. In other embodiments, the ISP server 107 (FIG. 1A) pushes the established rules to the WAPs using the ISP. With central control, the ISP server 107 (FIG. 1A) can manage the entire network and change rules as needed. For example, if the government passes a law that police, fire, medical organizations should have unfettered access to the wireless network, the ISP server 107 (FIG. 1A) can simply change the rules giving these public clients the highest priority and push the rules to the WAPs in the network. This ability eliminates the need to reconfigure separately every WAP, and the need to make the change on-site.

Figure 4:
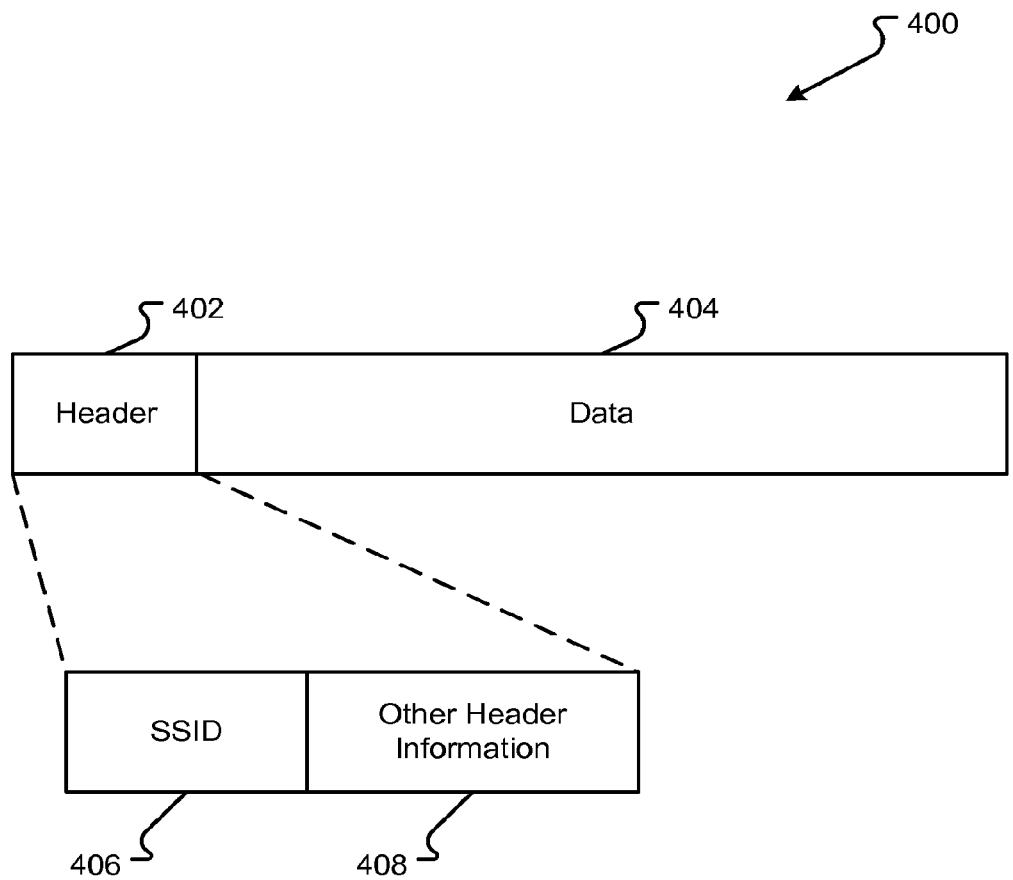
FIG. 4 is a block diagram of an embodiment of a data structure for a data packet transmitted through or by the wireless network.

An embodiment of a data packet 400 is shown in FIG. 4. Data packet 400 can be similar to or the same as data packet 302 (FIG. 3). The data packet 400 can have a header 402 and a data portion 404. The header 402 can include the SSID 406 and one or more other items of header information 408. The packet inspection component 304 (FIG. 3) can determine the location of the header 402 in a data packet 400. In other embodiments, the packet inspection component 304 (FIG. 3) determines a new data packet 400 is being received and can determine the first portion of the data packet 400 which includes the header 402.

Upon determining the header 402, the packet inspection component 304 (FIG. 3) can locate and read the SSID 406 from the header 402. In embodiments, the packet inspection component 304 (FIG. 3) sends the SSID 406 to the assignment engine 306 (FIG. 3). The SSID 406 may be sent contemporaneously or substantially at the same time as the data packet 302 (FIG. 3) is sent to the assignment engine 306 (FIG. 3).

In an alternative embodiment, the SSID is only assigned to the data packets according to the class of user. The packet inspection component 304 determines the type of service by conducting deep packet inspection and inspecting the data included in the data portion 404 of the data packet 400. For example, an email message may have certain data characteristics that identify the data packet 400 as an email message. The packet inspection component 304 can inspect the data packet 400 for the email message characteristics. Upon finding the characteristics, the packet inspection component 304 sends a message indicating the data packet 400 is associated with a best-effort data service. Similar determinations can be made for VoIP, video, audio, multimedia, and other types of service.

In still other embodiments, the SSID can identify different private or public access rights. The SSID can identify the security to be applied to data sent over the wireless network. For example, a user can have private access protected with a wireless security method (Wired Equivalency Privacy (WEP), Wi-Fi Protected Access (WPA), WPA2, strict authentication of devices under 802.1X or 802.11i, etc.). A user accessing the network using a different SSID may use a public network without security or little security applied to the data transmissions. Thus, a resident owning the equipment may have a private network while users using another WAP in bridge mode may have public access rights.

The priority engine 312 (FIG. 3) can determine which user has the higher priority to service. In embodiments, each SSID has an associated priority that reflects the priority of the type of service. An example of a priority scheme is shown in Table 1 below:

TABLE 1

Exemplary Priority Scheme

| SSID | User | Type of Service | Priority |
|------|------|-----------------|----------|
| 1 | Private Client (Residential User) | VoIP | 1 |
| 2 | Roaming Client (Wireless Access Point 1 - Contract User) | Best-Effort | 2 |
| 3 | Wireless Access Point 2 | Backhaul | 3 |
| 4 | Public Client (Wireless Access Point 3 - Non-contract User) | Video | 4 |

The first SSID (SSID 1) is assigned to the residential user, which may be the laptop 212 (FIG. 2) or the in-residence computer 210 (FIG. 2) associated with the owner of the equipment. The residential user is a private client. This user is the primary user of the bandwidth. Therefore, the residential user may have the highest priority to any bandwidth or QoS parameters. The second SSID (SSID 2) may be associated with a user, who is not the residential user, but who has a service contract with the ISP. Thus, this contract user may have the second priority. In embodiments, the third SSID (SSID 3) is associated with a wireless access point (e.g., WAP 214 (FIG. 2)) that has a backhaul connection through WAP 204 (FIG. 2). Since WAP 214 (FIG. 2) may have contract users accessing the Internet through the WAP 214 (FIG. 2), the Wireless Access Point 2 may have the third priority. Finally, a non-contract user may be assigned SSID 4 and have the lowest priority. A non-contract user is a user that does not have a service contract with the ISP but is using the WAP 204 (FIG. 2) for a one-time or infrequent connection. Table 1 provides only an example of possible priorities and one skilled in the art will recognize other types of service and other priority schemes.

Returning to FIG. 3, an allocation engine 314 can allocate bandwidth or other service parameters to each type of service. For example, the residential user may have a minimum bandwidth requirement, for example, 4.0 Mbps. In embodiments, the remaining bandwidth may be allocated among the other users. For example, a contract user may receive 3 Mbps while a non-contract user may receive 1 Mbps. The allocation may also may be dynamic. Thus, the residential user may receive all the bandwidth the user requires. Any remaining bandwidth may be allocated to the other user according to the priority of the user. Thus, if the second priority user is allocated all of the remaining bandwidth, the third priority user would not receive any bandwidth.

The allocation engine 314 may also allocate bandwidth among two or more virtual private networks (VPNs). Rather that managing separate connections on the same network, the allocation engine 314 can generate two or more VPNs. Each type of user may have one of the VPNs assigned. As such, the user interacts over a network having a separate set of properties, including the amount of bandwidth available.

The assignment engine 306 can assign bandwidth or a VPN to each of the users. In embodiments, the assignment engine 306 receives the SSID from the packet inspection component 304. If the SSID has been assigned an allocation of bandwidth, the amount of assigned bandwidth will be shown in a data structure in the database 316. The assignment engine 306 can retrieve the information from the database and enforce the amount of bandwidth assigned. If no allocation of bandwidth has been assigned, the assignment engine 306 can create a new record in the database 316. Then, the priority engine 312 and the allocation engine 314 can set priority and an allocation of bandwidth for the user. The priority and allocation may be stored in the database 316.

As the assignment engine 306 receives data packets from the packet inspection component 304, the assignment engine 306 ensures that the user is provided the correct service. Thus, the assignment engine 306 may interface with the priority engine 312 and/or the allocation engine 314 to provide the correct quality of service. In embodiments, the assignment engine 306 receives information about priority or allocation directly from the priority engine 312 and/or the allocation engine 314. In other embodiments, the priority engine 312 and/or the allocation engine 314 stores the priority and/or allocation information in the database 316. The assignment engine 306 then retrieves the information from the database 316. The assignment engine 306 may receive the information after receiving or assigning the SSID. In subsequent transmissions from and/or to the user with the SSID, the assignment engine 306 need not retrieve the information again.

The assignment engine 306 can send the assignment information, the VPN or bandwidth allocation for the SSID, to the network communication component 308. In embodiments, the networking component 308 is the hardware, software, or hardware and software for the wireless connection (similar to wireless connection 110 (FIG. 1)). In other embodiments, the networking component 308 is the hardware, software, or hardware and software for the network 106 (FIG. 1). Thus, the system 300 can control the multi-mode connections in the DSL communication processor 202, the DSP device 220, and/or the wireless communication component 204.

The network communication component 308 can receive packets from the assignment component 306. The network communication component 308 can control the bandwidth provided a user by communicating the allowed bandwidth to the user. In other embodiments, the network communication component 308 rejects packets above the threshold for the allowed bandwidth. In still other embodiments, the network communication component 308 queues packets that are over the bandwidth and sends the packets. Regardless, the network communication component 308 controls the amount of bandwidth provided to each user.

Figure 5:
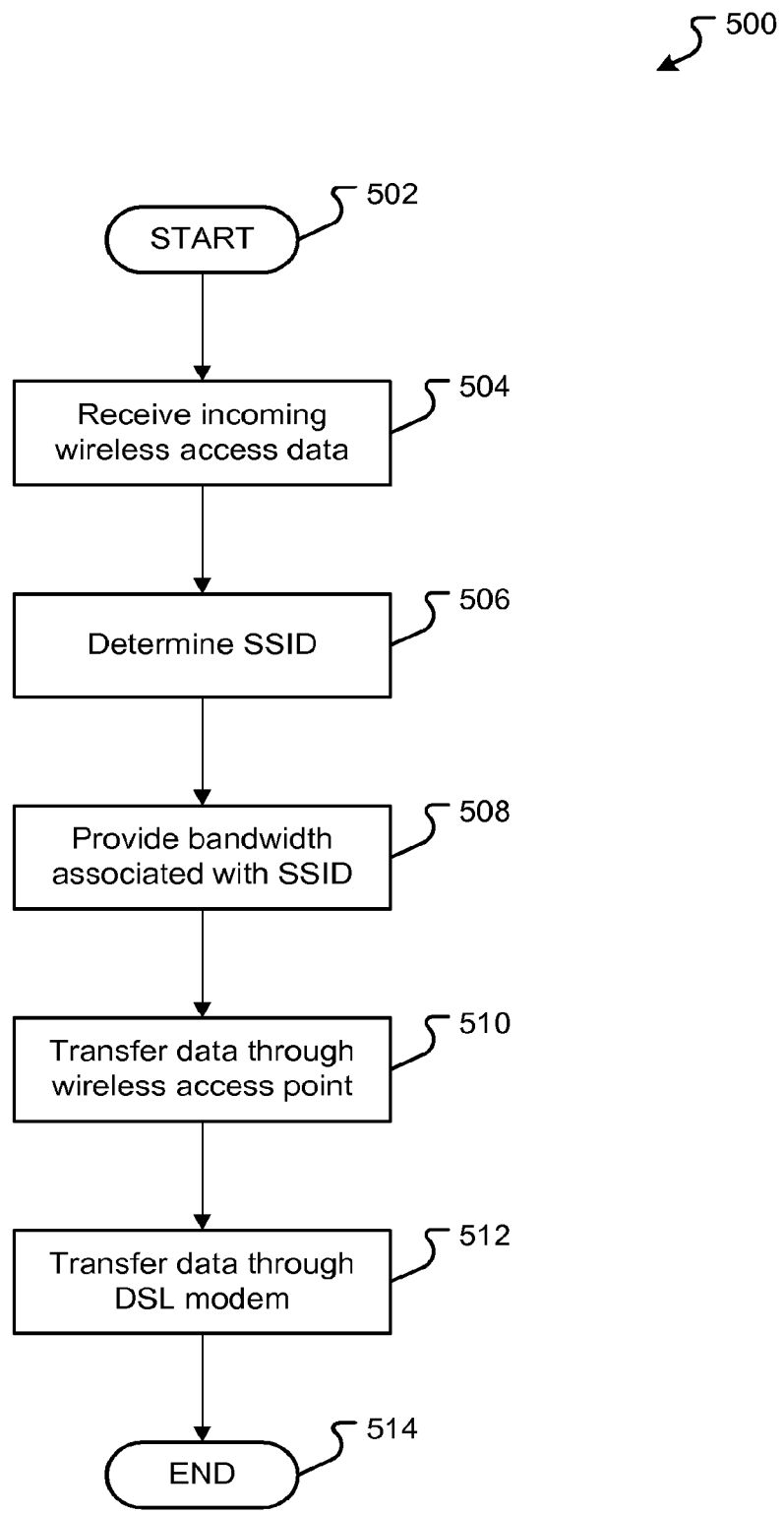
FIG. 5 is a flow diagram of an embodiment of a method for providing bandwidth to different types of service in a wireless network.

An embodiment of a method 500 for providing a point of presence for a wireless network is shown in FIG. 5. In embodiments, the method 500 generally begins with a START operation 502 and terminates with an END operation 514. The steps shown in the method 500 may be executed in a computer system as a set of computer executable instructions. While a logical order is shown in FIG. 5, the steps shown or described can, in some circumstances, be executed in a different order than presented herein. The method 500 will hereinafter be explained with reference to FIGS. 1-4.

A wireless access point 104 receives an incoming wireless data packet in step 504. The wireless data packet may be received from another wireless access point 108. In embodiments, one or more hardware components (e.g., antennae, transceiver, etc.) receives the wireless data packet. The wireless data packet may then be forwarded to the packet inspection component 304. The packet inspection component 304 receives the wireless data packet for the wireless access point 104.

The wireless access data packet is inspected by the packet inspection component 304 to determine the SSID associated with the data packet in step 506. In embodiments, the packet inspection component 304 scans the header 402 for the SSID 406. The packet inspection component 304 can then read the SSID 406 from the header information 402.

The network communications component 308 receives the data packet and provides the appropriate bandwidth associated with the SSID in step 508. To provide the appropriate bandwidth, the assignment engine 306 may receive the data packet and the SSID from the packet inspection component 304. The assignment engine 306 searches the database 316 for information about the SSID. Upon finding the SSID, the assignment engine 306 can assign an amount of bandwidth to the SSID. The assignment engine 306 may base the amount of bandwidth on the priority assigned the SSID by the priority engine 312. The priority for the SSID can be a function of the type of data or service associated with the SSID. For example, if the type of data or service is internet backhaul service for a wireless access point 108, then the SSID will be assigned a lower priority than a data packet from the user 105 that owns the wireless access equipment 104.

In embodiments, an allocation engine 314 may determine how to divide the bandwidth. For example, the allocation engine may provide a set 6 Mbps to the user 105 and then provide only 2 Mbps to the user 109 connected through the wireless access point 108 using the bachhaul to the WAP 104. In other embodiments, the amount of bandwidth allocation is dynamic. The allocation engine 314 provides the user 105 with as much bandwidth as necessary. The other services may split the remaining bandwidth as necessary. A priority list may be used to determine the amount of bandwidth for the remaining users. As such, a second higher priority user may receive as much bandwidth as required and then each user be given bandwidth as needed until no bandwidth remains. Some users with the lowest priorities may not receive any bandwidth in some circumstances.

The information about the priority or allocation is provided to the assignment engine 306. The assignment engine 306 provides the assignment of the bandwidth to the network communication component 308 that limits the bandwidth for the data packet. The network communication component 308 may then send the data packet through the WAP to the DSL modem in step 510. The NID 202 can receive the data packet and transfer the data through the NID 202 to the network 106 in step 512.

In embodiments, a similar procedure can occur for data downloaded to a user through the WAP 104. Data may be received at the WAP 204 from the NID 202. The packet inspection component 304 can determine the SSID. The assignment engine 306 can assign a certain amount of bandwidth for the WAP 204 according to an allocation for the SSID. The WAP 204 may then send the data to a user having a set bandwidth. In other embodiments, the amount of bandwidth associated with an SSID is the sum of both the upload and the download rates.

Figure 6:
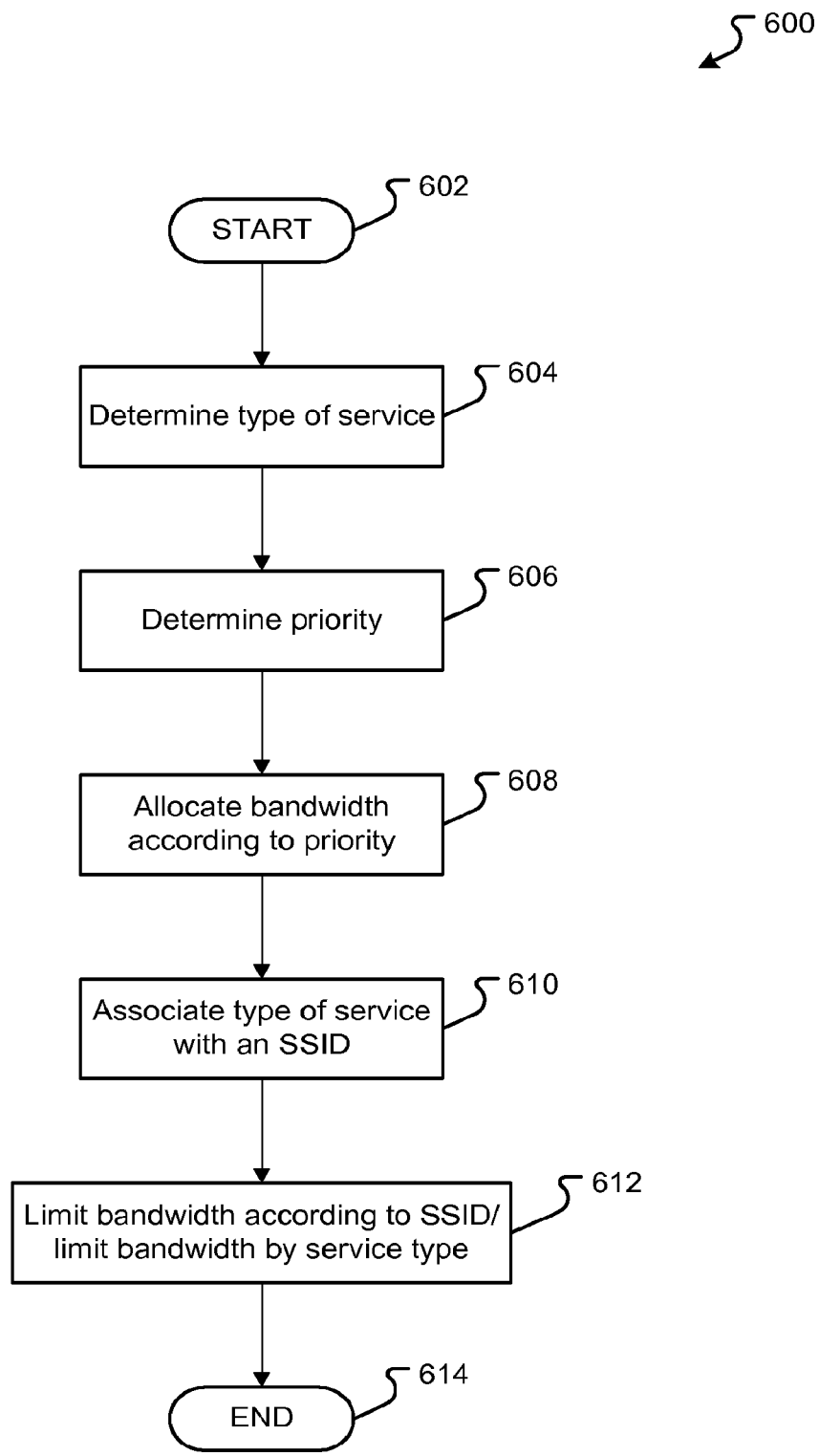
FIG. 6 is a flow diagram of an embodiment of allocating bandwidth to different types of service.

An embodiment of a method 600 for providing a point of presence for a wireless network is shown in FIG. 6. In embodiments, the method 600 generally begins with a START operation 602 and terminates with an END operation 614. The steps shown in the method 600 may be executed in a computer system as a set of computer executable instructions. While a logical order is shown in FIG. 6, the steps shown or described can, in some circumstances, be executed in a different order than presented herein. The method 600 will hereinafter be explained with reference to FIGS. 1-4.

The NID/WAP equipment 200 can determine the type of service in step 604. The type of service can include, but is not limited to, resident customer service, customer wireless access, backhaul service, backhaul service for non-customers, etc. Each type of service can be identified based on various characteristics. For example, the type of service can be based on the customer being serviced (customer with an account, customer that owns the local equipment, non-customer, etc.), the type of access (local wireless, backhaul, etc.), the type of information being uploaded or downloaded (e.g., video download, audio download, email, etc.), or other characteristics. In embodiments, the ISP or controller of the network 106 interfaces with the NID/WAP equipment 200 to establish the types of service categories and characteristics.

The priorities for the different types of service are determined in step 606. In embodiments, the ISP or controller of the network 106 establishes the priorities for the different types of services. The priorities can be based on operational or business concerns. For example, backhaul service may be rated a higher priority that wireless access for a non-customer in some circumstances. The ISP or controller of the network 106 may remotely interface with the NID/WAP equipment 200 to establish the types of service and the priorities.

The ISP or controller of the network 106 can establish a system to allocate bandwidth to the various types of service depending on the priority in step 608. In embodiments, the ISP or controller of the network 106 remotely interfaces with the NID/WAP equipment 200 to set bandwidths for the different types of service. For example, the local customer may receive 8 Mbps out of a total 12 Mbps. A backhaul service may receive 3 Mbps. In other embodiments, the ISP or controller of the network 106 may establish a rule to allocate bandwidth. For example, the rules may allow the local customer to user as much bandwidth as needed for an action and then allow the next highest priority type of service to use as much bandwidth as needed. The amount of bandwidth needed may be measured by the speed of an incoming or outgoing signal. As such, the bandwidth allocation ensures that the local interface is not a bottleneck for the customer. Other methods for allocating the bandwidth are possible and contemplated.

Each type of service may be given an SSID, and each SSID may be associated with the type of service in step 610. For example, the NID/WAP equipment 200 can generate an SSID for each user using each type of service. Each user using a certain type of service can have their assigned SSID associated with the type of service. The NID/WAP equipment 200 stores the SSID allocation in a database 316.

In embodiments, band width is initially limited by the SSID, but may be further limited by the particular service if multiple services are supported by the SSID. The amount of bandwidth allowed for any user can be limited according to the SSID in step 612. The NID/WAP equipment 200 can also determine the amount of bandwidth for each type of service. Each user with an SSID associated with a particular type of service can then have the bandwidth allocated limited according to SSID and/or the type of service requested by the user. In embodiments, the amount of bandwidth allocated for two or more users using the same type of service can also be determined. For example, a first user may be allocated more bandwidth than a second user even if both users are using the same type of service. The NID/WAP equipment 200 stores the allocations for each SSID in a database 316 for retrieval and can complete packet inspection to determine the type of service requested.

Figure 7:
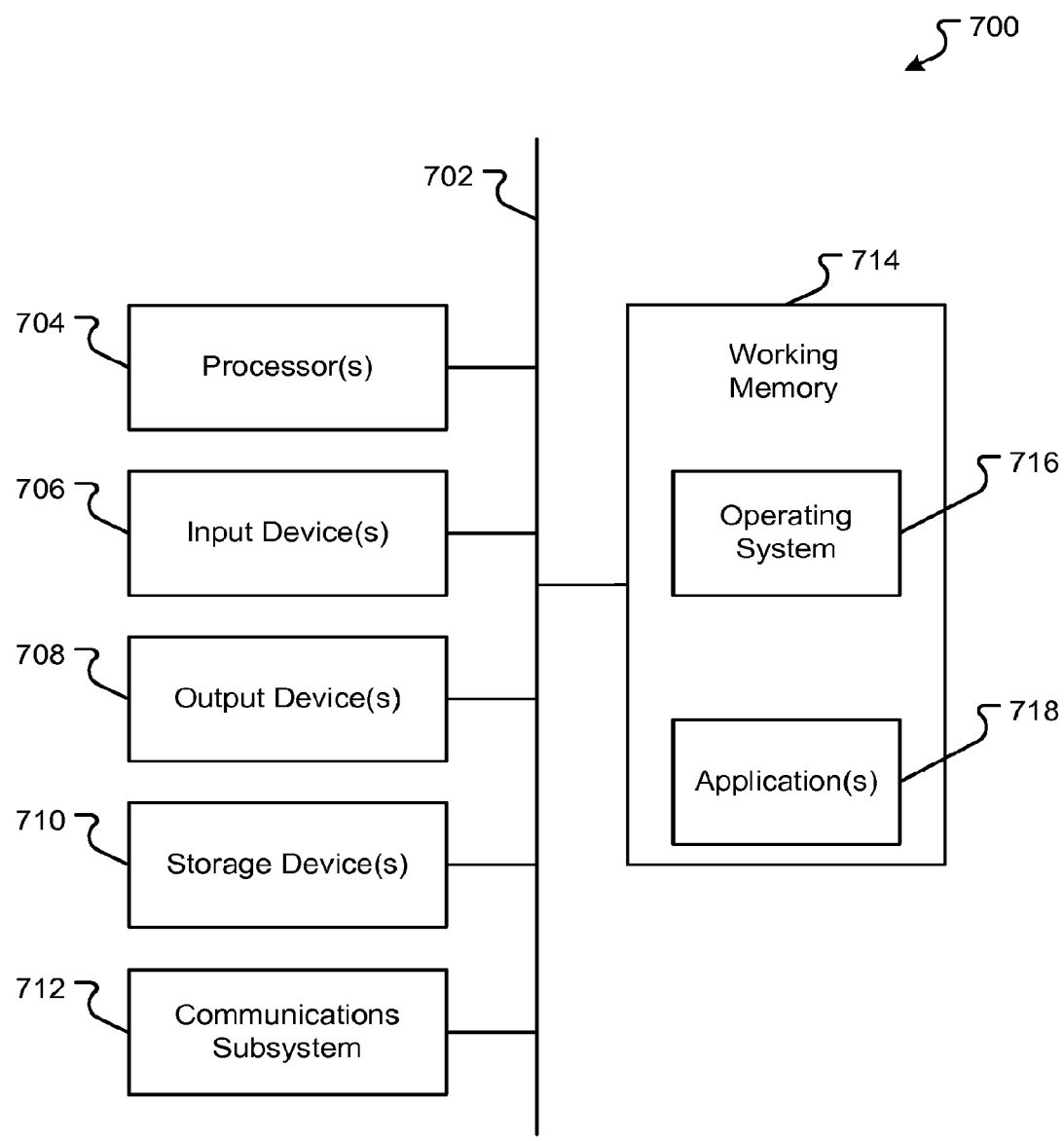
FIG. 7 is a block diagram of an embodiment of a computer system operable in the wireless network.

FIG. 7 provides a generic schematic illustration of a structure of a device 700 that may be used to implement all or a portion of the NID/WAP 104, user computer 105, WAP 108, or one or more other systems or components described herein. Those skilled in the art will appreciate that various modifications and/or customizations of the device 700 may be appropriate, depending on the role of the device 700 in various embodiments. Hence, FIG. 7 should be understood to illustrate broadly how individual device elements may be implemented in a relatively separated or relatively more integrated manner. The device 700 is shown comprised of hardware elements that are electrically coupled via bus 702, including a processor 704, an input device 706, an output device 708, one or more storage device(s) 710, and a memory 714. The computer system may also include a computer-readable storage media reader that may be further connected to a computer-readable storage medium, the combination comprehensively representing remote, local, fixed, and/or removable storage devices plus storage media for temporarily and/or more permanently containing computer-readable information. The communications subsystem 712 may comprise a wired, wireless, modem, and/or other type of interfacing connection and may permit data to be exchanged with the various other system components.

The device 700 may also comprise software elements, shown as being currently located within working memory 714, including an operating system 716 and other code 718, such as one or more application programs designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 8:
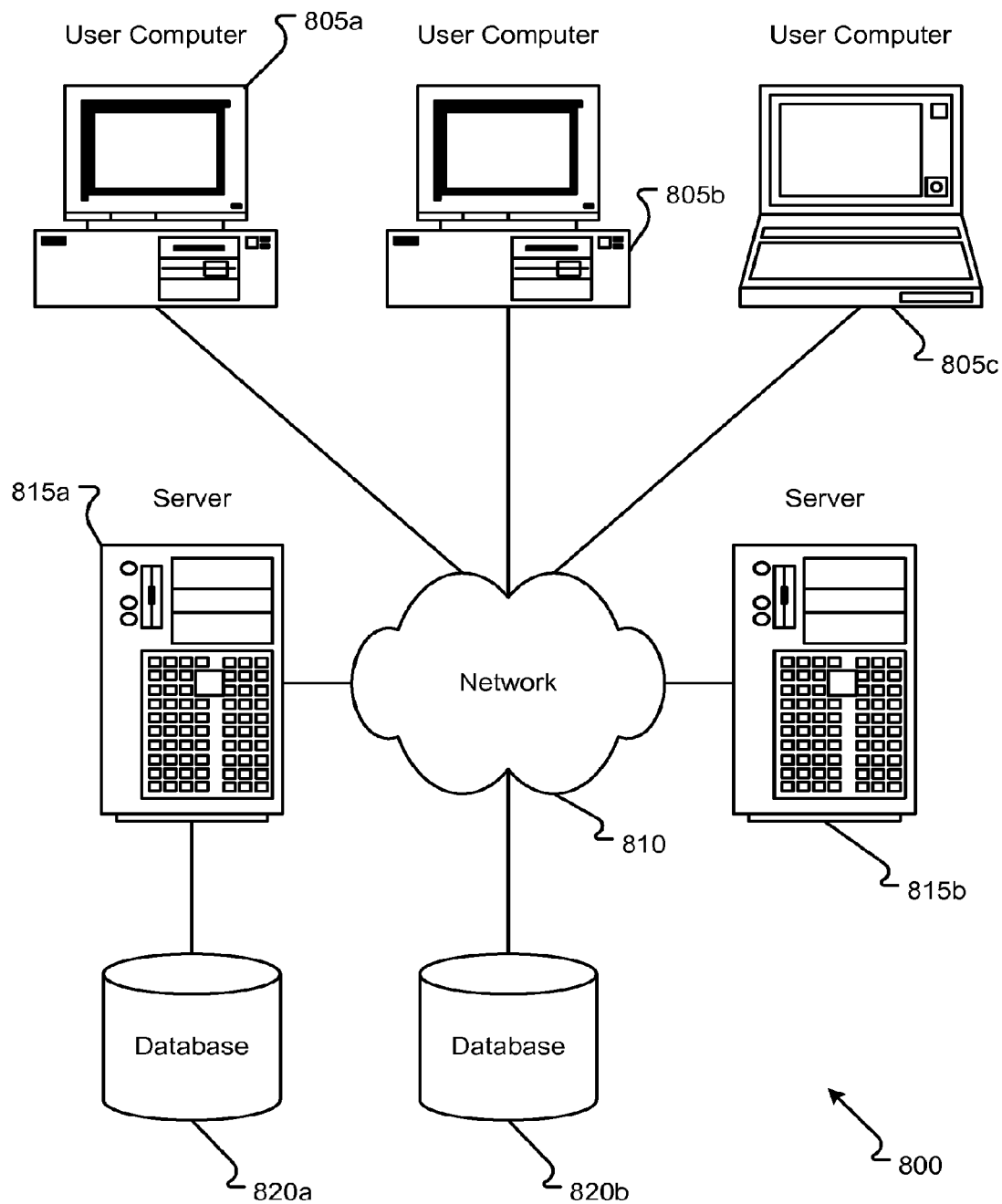
FIG. 8 is a block diagram of an embodiment of a network.

Several exemplary embodiments of the invention will be described in detail. For instance, FIG. 8 illustrates a schematic diagram of a system 800 that can be used in accordance with one set of embodiments. The system 800 can include one or more user devices 805a, 805b, and 805c, which, purely for illustrative purposes, are shown on FIG. 8 as a user desktop computer 805a, a user desktop computer 805b, and a laptop computer 805c. The user devices 805a, 805b, and 805c can comprise any device capable of data and/or voice communication. Exemplary user devices can include general purpose personal computers (e.g., 805a) (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. Alternatively, the user devices 805a, 805b, and 805c can be any other electronic device, such as a thin-client computer, POTS telephone, wireless telephone, Internet-enabled mobile telephone, handheld computer and/or personal digital assistant, capable of voice and/or data communication, including merely by way of example communication via a computer network and/or displaying and navigating web pages or other types of electronic documents. These user devices 805a, 805b, and 805c, depending on their capabilities, can also have any of a variety of applications, including one or more database client and/or server applications, and/or web browser applications. Although the exemplary system 800 is shown with three user devices, any number of user computers can be supported.

Certain embodiments of the invention operate in a networked environment, including a network 810. The network 810 can be any type of network familiar to those skilled in the art that can support data communications using any of a variety of commercially-available protocols, including without limitation TCP/IP, SNA, IPX, AppleTalk™, and the like. Merely by way of example, the network 810 can be a local area network ("LAN") including without limitation an Ethernet network, a Token-Ring network and/or the like; a wide-area network; a virtual network, including without limitation a virtual private network ("VPN"); the Internet; an intranet; an extranet; a telephone network, including without limitation a public switched telephone network ("PSTN"), a wireless telephone network, a private branch exchange ("PBX") and/or the like; an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 815a and/or 815b which can serve as processing systems in accordance with certain embodiments of the invention. Merely by way of example, a server 815a and/or 815b may be a web server, which can be used to process requests for web pages or other electronic documents from user devices 805a, 805b, and 805c. The servers 815a and 815b each can be running an operating system, including without limitation any of those discussed above, as well as any commercially-available server operating systems, including, merely by way of example, OS/390™, OS/400™, VMS™, UNIX™ (including any of its varieties and/or similar variants), and the like. The servers 815a and 815b can also run a variety of server applications, including HTTP servers, FTP servers, CGI servers, database servers, Java servers, and the like.

Servers 815a and 815b can also include one or more file servers, application servers and/or transaction processing servers, which can, in addition to an operating system, include one or more applications accessible by a client running on one or more of the client devices 805a, 805b, and 805c. Merely by way of example, the server(s) 815a and/or 815b can be one or more general purpose computers capable of executing programs or scripts in response to requests from and/or interaction with the user devices 805a, 805b, and 805c, including without limitation web applications. Such web applications can be implemented as one or more scripts or programs written in any programming language, such as Java™, C, or C++, or any scripting language, such as Perl, Python, or TCL, or any combination thereof. The servers 815a and 815b can also include database servers, including without limitation those commercially available from Oracle™, Microsoft™, Sybase™, IBM™ and the like, which can process requests from database clients running on a user device. In some embodiments, one or more servers 815a and 815b can create web pages dynamically for performing methods of the invention. These web pages can serve as an interface between the user devices 805a, 805b, and 805c and the servers 815a and 815b. Alternatively, a server 815a and 815b may run a server application, while a user device (e.g., 805a, 805b, and 805c) can run a dedicated client application. The server application, therefore, can serve as an interface for the user device running the client application.

In some implementations, a server 815a and/or 815b may include a telephone interface, which can allow the server to interact with an ordinary (POTS) telephone. The telephone interface, which may be implemented in software and/or hardware embodied in the server 815a, 815b, and/or in a separate device in communication with the server, can provide integrated voice response ("IVR") features familiar to those skilled in the art. The telephone interface also can be configured to interpret dual tone multi-frequency (commonly known as "DTMF" or "Touchtone®") tones as data input. Thus, in accordance with embodiments of the invention, the telephone interface can allow for a user to interact with a server 815a and 815b via voice and/or DTMF commands.

In certain embodiments, the system can include a database 820a and/or 820b. The location of the database 820a and/or 820b is discretionary: the database 820a and/or 820b can reside on a storage medium local to (and/or resident in) one or more of the computers and/or user devices 805a, 805b, 805c, 815a and 815b. Alternatively, the database 820a and/or 820b can be remote from any or all of the computers 805a, 805b, 805c, 815a and 815b, so long as the database 820a and/or 820b are in communication (e.g., via the network 810) with one or more of these. In a particular set of embodiments, the database 820a and/or 820b can reside in a storage-area network ("SAN") familiar to those skilled in the art. (Likewise, any necessary files for performing the functions attributed to the devices and/or computers 805a, 805b, 805c, 815a and 815b can be stored locally on the respective computer and/or remotely, as appropriate.) In an embodiment, the database 820a and/or 820b can be a relational database, that is adapted to store, update, and retrieve data in response to SQL-formatted commands.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

In light of the above description, a number of advantages of the present disclosure are readily apparent. For example, the in-residence WAP can allow for access from various other WAPs. Due to the abundance of the in-residence WAPs, a municipal wireless network can be created with several POPs. This configuration improves access and the bandwidth allocation of previous networks. Further, the embodiments presented can provide a customizable allocation of bandwidth based on the type of service. Thus, the in-residence user can be provided sufficient bandwidth while allocating other bandwidth to other users.

While the principles of the disclosure have been described above in connection with specific apparatuses and methods, it is to be clearly understood that this description is made only by way of example and not as limitation on the scope of the disclosure.

What is claimed is:

1. A method for allocating bandwidth in a wireless network, the method comprising:
   receiving first data from a first user, the first user identified by a first SSID, wherein the first user is associated with a first class of service;
   receiving second data from a second user, the second user identified by a second SSID, wherein the second user is associated with a second class of service;
   allocating a first connection type to the first user identified by the first SSID; and
   allocating a second connection type to the second user identified by the second SSID;
   wherein the first connection type and the second connection type are determined based on the first class of service and the second class of service;
   wherein the first class of service has a first priority and the second class of service has a second priority and the first priority is greater than the second priority; and
   wherein each of the first SSID or the second SSID has an associated priority that reflects the priority of the corresponding class of service.

2. The method of claim 1, wherein the first connection type is based on one of portion of bandwidth or quality of service parameters.

3. The method of claim 1, wherein the first class of service and second class of service are based on the type of data being downloaded.

4. The method of claim 3, wherein the type of data being downloaded is one of video, audio, email, multimedia, VoIP, or best-effort.

5. The method of claim 1, wherein the first class of service and the second class of service are based on the type of user access of the wireless network.

6. The method of claim 5, wherein the first class of service is private clients and the second class of service is public clients.

7. The method of claim 6, wherein the type of user access includes one of private access, public access, or roaming access.

8. The method of claim 7, wherein private access includes one of a residential subscriber access through a private WiFi network connection and a roaming subscriber access through a public network connection.

9. The method of claim 1, wherein public access includes one of a residential non-subscriber access via a public network access, a business equivalent access, and access from a preferred class of non-subscriber user.

10. The method of claim 1, wherein the first SSID is associated with a first virtual private network and the second SSID is associated with a second virtual private network.

11. The method of claim 10, wherein the first connection type is allocated to the first virtual private network and the second connection type is allocated to the second virtual private network.

12. The method of claim 10, wherein the first virtual private network has a higher security requirement than the second virtual private network.

13. The method of claim 1, wherein a first wireless access point ("WAP") receives the first data from the first user and wherein a second WAP accesses the first WAP using a bridge mode, the first WAP receiving the second data from the second user via the second WAP.

14. The method of claim 1, further comprising:
    determining the first SSID for the first data; and
    determining the second SSID for the second data.

15. The method of claim 14, wherein determining the first SSID for the first data comprises:
    inspecting a header of the first data for the SSID; and
    conducting deep packet inspection on the first data to determine if the first data is permitted to be sent with the SSID.

16. The method of claim 1, wherein a type of data is determined by inspecting a data portion of a data packet for characteristics associated with the type of data.

17. The method of claim 1, wherein a first portion of bandwidth allocated for the first type of connection is different from a second portion of bandwidth allocated for a second type of connection.

18. The method of claim 1, wherein a first quality of service allocated for the first type of connection is different from a second quality of service allocated for a second type of connection.

19. The method of claim 18, wherein the first quality of service is associated with one of a delay requirement, a jitter requirement, a dropped packet requirement, an error rate requirement, an out-of-order delivery requirement, or a latency requirement.

20. The method of claim 1, wherein the first priority is associated with a quality of service requirement.

21. The method of claim 1, wherein the first priority is associated with a type of service.

22. A multi-mode wireless access point for allocating bandwidth in a wireless network, the multi-mode wireless access point comprising:
    a processor; and
    a non-transitory computer readable medium having stored therein a set of code executable by the processor, the set of code comprising:
        code for receiving first data from a first user, the first user identified by a first SSID, wherein the first user is associated with a first class of service;
        code for receiving second data from a second user, the second user identified by a second SSID, wherein the second user is associated with a second class of service;
        code for allocating a first connection type to the first user identified by the first SSID; and
        code for allocating a second connection type to the second user identified by the second SSID;
    wherein the first connection type and the second connection type are determined based on the first class of service and the second class of service;
    wherein the first class of service has a first priority and the second class of service has a second priority and the first priority is greater than the second priority; and
    wherein each of the first SSID or the second SSID has an associated priority that reflects the priority of the corresponding class of service.

23. An apparatus, comprising:
    a non-transitory computer readable medium having stored therein a set of code executable by the processor, the set of code comprising:
        code for receiving first data from a first user, the first user identified by a first SSID, wherein the first user is associated with a first class of service;
        code for receiving second data from a second user, the second user identified by a second SSID, wherein the second user is associated with a second class of service;
        code for allocating a first connection type to the first user identified by the first SSID; and
        code for allocating a second connection type to the second user identified by the second SSID;
    wherein the first connection type and the second connection type are determined based on the first class of service and the second class of service;
    wherein the first class of service has a first priority and the second class of service has a second priority and the first priority is greater than the second priority; and
    wherein each of the first SSID or the second SSID has an associated priority that reflects the priority of the corresponding class of service.

* * * * *